United States Patent
Zhai et al.

(10) Patent No.: US 8,498,250 B2
(45) Date of Patent: Jul. 30, 2013

(54) NEIGHBOR DISCOVERY OVER MULTIPLE CHANNELS FOR WIRELESS NETWORKS WITH DIRECTIONAL ANTENNAS

(75) Inventors: Hong Zhai, Ossining, NY (US); Chun-Ting Chou, Taipei (TW); Richard Chen, Croton-On-Hudson, NY (US)

(73) Assignee: Koninklijke Philips N.V., Eindhoven (NL)

(*) Notice: Subject to any disclaimer, the term of this patent is extended or adjusted under 35 U.S.C. 154(b) by 343 days.

(21) Appl. No.: 12/522,954

(22) PCT Filed: Jan. 16, 2008

(86) PCT No.: PCT/IB2008/050158
§ 371 (c)(1),
(2), (4) Date: Feb. 24, 2010

(87) PCT Pub. No.: WO2008/087596
PCT Pub. Date: Jul. 24, 2008

(65) Prior Publication Data
US 2010/0142460 A1    Jun. 10, 2010

Related U.S. Application Data

(60) Provisional application No. 60/885,187, filed on Jan. 16, 2007.

(51) Int. Cl.
*H04W 4/00* (2009.01)
(52) U.S. Cl.
USPC .......................................... 370/329; 455/434
(58) Field of Classification Search
None
See application file for complete search history.

(56) References Cited

U.S. PATENT DOCUMENTS

| 7,043,265 B2 * | 5/2006 | Nir et al. ................. 455/502 |
| 2006/0025136 A1 * | 2/2006 | Fujita et al. ............... 455/436 |
| 2006/0223573 A1 * | 10/2006 | Jalali ......................... 455/552.1 |
| 2008/0045210 A1 * | 2/2008 | Kaaja et al. ................. 455/434 |

OTHER PUBLICATIONS

Guangyu Pei et al., "A neighbor Discovery Protocol for Directional Antenna Networks", Military Communications Conference, 2005, Milcom 2005, IEEE, pp. 1-6, XP010901570.
Ece Gelal et al., "An Integrated Scheme for fully-Directional Neighbor Discovery and Topology Management in Mobile Ad Hov Networks", Mobile Ad Hoc and Sensor Systems (MASS), 2006 IEEE Internationals Conf. on IEEE, pp. 139-149, XP031003827.
"ECMA International: Standard ECMA-368 High rate Ultra Wideband PHY and MAC Standard", ist Edition (online), Dec. 2005, XP002484177 http://www.ccs.neu.edu/home/subline/Ref_5.pdf.

* cited by examiner

*Primary Examiner* — Chi Pham
*Assistant Examiner* — Mohammad Adhami
(74) *Attorney, Agent, or Firm* — Larry Liberchuk (57) ABSTRACT

A communication system includes first and second devices, where a processor of at least one of the first device and the second device is configured to establish a superframe having a superframe duration ($T_s$) and transmit a beacon by the first device during each of the superframe duration ($T_s$); scan by the second device all sectors ($N_{beam}$) by scanning each sector for a superframe duration ($T_s$) and repeating a jump sequence. The jump sequence has a sequence duration ($T_{total}$) which is equal to a sum of a control duration ($T_c$) of a control channel and durations of data channels ($KT_d$). The processor is further configured to find the first device by the second device during a find time ($T_f$), where the control duration ($T_c$) is greater than the durations of data channels ($KT_d$).

24 Claims, 3 Drawing Sheets

NEIGHBOR DISCOVERY OVER MULTIPLE CHANNELS FOR WIRELESS NETWORKS WITH DIRECTIONAL ANTENNAS

This application claims the benefits of U.S. Provisional Patent Application Ser. Nos. 60/885,187, 60/885,184 and 60/885,192, all filed Jan. 16, 2007, including associated International Application Nos. PCT/IB/2008/050157 and PCT/IB/2008/050136, both filed on Jan. 16, 2008, which are all incorporated herein by reference in their entireties.

The present system relates to systems, methods, user interfaces (UIs) and devices for discovering mixed types of directional terminals within a wireless network and establishing communication between the directional terminals.

As the wireless spectrum becomes more and more significant as a means of maintaining connectivity, the spectrum becomes more and more crowded which can create problems for wireless access and/or interaction points. An idea of ubiquitous communications for devices in mundane device types, such as refrigerators, washing machines, toys, etc. presents not only a problem in spectrum, but extending connectivity to these devices presents a further problem in that connectivity needs to be reliable, although not necessarily with any quality of service (QoS) requirements, and must be cheap. Wireless personal area networks (WPANs) are thought to serve this need and are the subject of an IEEE 802.15 working group having several task groups that focus on different parts of this problem.

Omni-directional antennas, such as under the IEEE 802.11 working groups are desirable for tasks such as personal computing and data transfer within a local area network yet require higher cost components that must satisfy at least some aspects of QoS that are not required of WPANs. Further, the power requirements of omni-directional antennas makes them ill-suited for most WPAN applications that typically require lower power, shorter distance transmissions.

Traditional wireless devices equipped with omni-directional antennas broadcast each packet in all directions. As may be readily appreciated, directional antennas may be utilized that only transmit towards one direction at a time. However, with the same transmission power, directional antennas have much higher antenna gain and transmit to a longer distance. Of course, less power is needed when using a directional antenna to achieve a range similar to the range of an omni-directional antenna. Wireless devices using directional antennas may also have a simplified design and may be implemented to take advantage of spatial reuse. A WPAN formed by devices that employ directional antennas is referred to as a Directional WPAN or D-WPAN as referred to herein after.

A wireless spectrum is often divided into multiple channels. Devices may communicate over one channel without interfering with communications over other channels, while two concurrent transmissions over the same channel may interfere with each other. Therefore, using multiple channels has the potential to increase the throughput by multiple times. To reduce the complexity of antenna design and hardware cost, some antennas have fixed transmission directions or choose to transmit towards only one direction. These antennas generally can not change transmission direction independently, and can only be changed by a user manipulating a position of the wireless device.

As may be readily appreciated, by utilizing a fixed directional beam from each of the antennas, the distance or range of communication may be increased and/or power and component costs may be reduced as compared to the omni-directional antennas discussed above. Fixed directional antennas, for example, are well suited for extending a local area network (LAN) between two locations, such as between two buildings. In this type of a system, each building may include a LAN or a portion thereof. Directional antenna devices may be utilized to bridge the LANs between the buildings with high reliability and without a need to run a fixed (e.g., wired) system between the buildings. Instead of a fixed directional beam, a wireless device may have a directional beam which may be steered toward different directions or sectors, including steering through various sectors to cover a full circle, full sphere or 360° range. The steering of the directional antenna or beam may be performed manually or automatically, such as disclosed in U.S. Provisional Patent Application Ser. No. 60/885,192.

Figure 1:
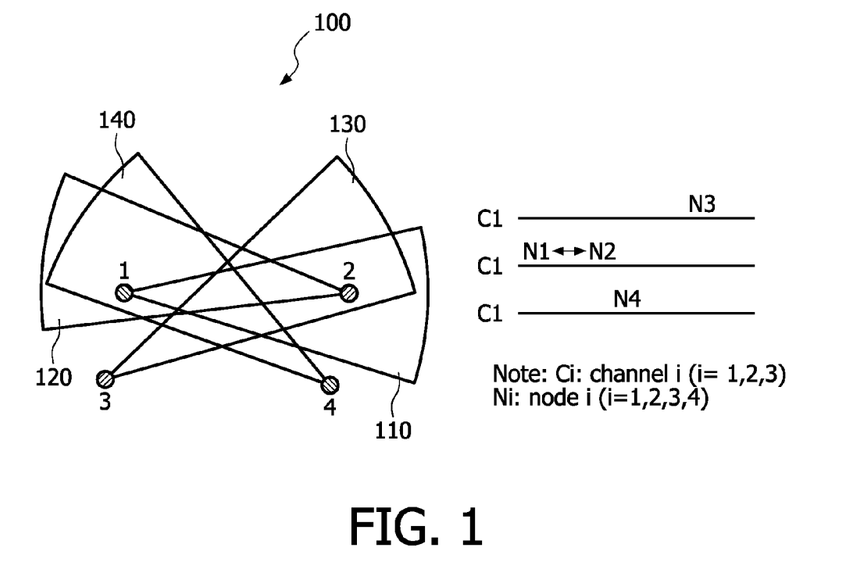
FIG. 1 shows directional transmission and multiple channels of wireless devices according to one embodiment of the present system.

FIG. 1 shows a wireless communication system 100 with four wireless devices 1, 2, 3, 4 having directional antennas, where devices that desire to communicate with each other need to have their directional antennas face each other, be within communication or antenna range of the respective antenna, and be on the same channel.

In the system 100, the first antenna range 110 of the first device 1 encompasses the second device 2, and the second antenna range 120 of the second device 2 encompasses the first device 1. Further, both devices 1 and 2, also shown as wireless nodes N1, N2, are on the same channel, namely channel C2, and thus may communicate with each other. As shown in FIG. 1, the third antenna range 130 of the third device 3 encompasses the second device 2, the fourth antenna range 140 of the fourth device 4 encompasses the first device 1. Further, in this scenario, the third device 3 or node N3 is on channel C1 and the fourth device 4 or node N4 is on channel C3. Because the third and fourth devices 3 and 4 do not face their directional antennas towards each other either, and are not on the same channel, they cannot communicate with each other.

Before wireless devices with directional antennas can communicate with each other, the devices need to discover each other, e.g., have their directional antennas face each other and select a common communication channel. Conventional device discovery includes manual discovery via user input, such a manual steering of the antennas towards each other and manual selection of the same common channel. Conventional automatic discovery is complex and time consuming where all directions and all channels are scanned. There is a need for an efficient method for devices to find each other, including finding and selecting a common available channel in order to start data communications between at least two devices on the selected channel (common to the at least two devices).

One object of the present systems, methods, communication protocols and devices is to overcome the disadvantages of conventional communication systems and devices. According to one illustrative embodiment, a communication system includes first and second devices, where a processor of at least one of the first device and the second device is configured to establish a superframe having a superframe duration ($T_s$) and transmit a beacon by the first device during each of the superframe duration ($T_s$); scan by the second device all sectors ($N_{beam}$) by scanning each sector for a superframe duration ($T_s$) and repeating a jump sequence. The jump sequence has a sequence duration ($T_{total}$) which is equal to a sum of a control duration ($T_c$) of a control channel and durations of data channels ($KT_d$). The processor is further configured to find the first device by the second device during a find time ($T_f$), where the control duration ($T_c$) is greater than the durations of data channels ($KT_d$).

Further areas of applicability of the present devices, systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

The following description of certain exemplary embodiments is merely exemplary in nature and is in no way intended to limit the invention, its applications, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

For purposes of simplifying a description of the present system, the term "operatively coupled" and formatives thereof as utilized herein refer to a connection between devices or portions thereof that enables operation in accordance with the present system. For example, an operative coupling may include one or more of a wired connection and/or a wireless connection between two or more devices that enables a one and/or two-way communication path between the devices or portions thereof.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

In one embodiment, a multi-channel neighbor discovery algorithm when executed on a processor (shown in FIG. 6 as reference numeral 620) allows devices to find each other, go to the same channel, face their directional antennas towards each other, and be able to communicate with each other. The multi-channel neighbor discovery algorithm when executed on the processor 620 may be configured to assign a fixed channel, e.g., channel 1, to be a common control channel, where other channels are deemed to be data channels. The control channel may be used to exchange control and other information to facilitate the devices to find each other. The data channels are mainly used for data or content communication. Of course, the control channel may be also used for data/content communication. The data or content may be any type of data, such as audio, video, text, images, etc. Each channel, whether the control channel or the data channel has a duration of one or an integer multiple of a superframe structure used by each device, such as the devices 1, 2, 3, 4 shown in FIG. 1.

Figure 2:
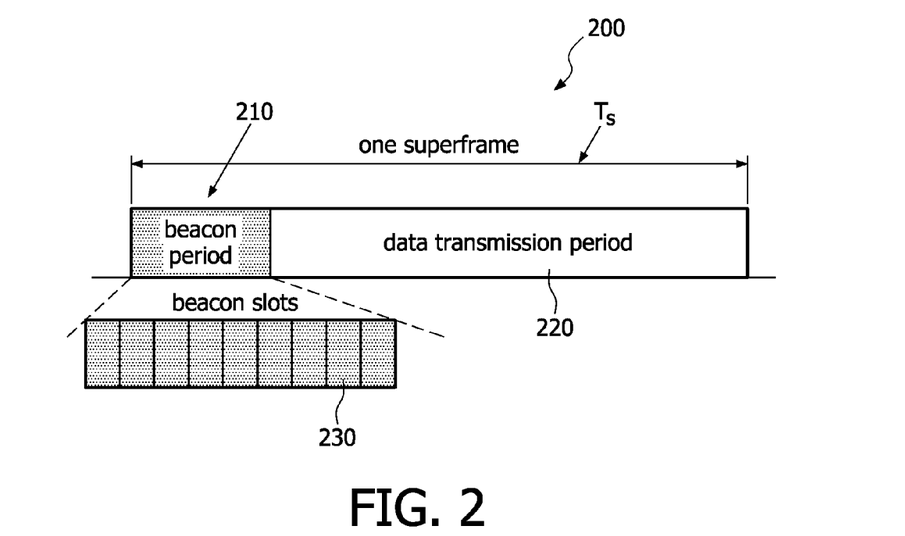
FIG. 2 shows a superframe structure for wireless devices in a wireless network according to one embodiment.

FIG. 2 shows a superframe structure 200 established by at least one of the devices 1, 2, 3, 4 and used by of the devices 1, 2, 3, 4. Each superframe 200 has a duration of time period $T_s$ that includes a beacon period 210 for beacon transmission and a data transmission period 220 for data or content transmission. One beacon period 210 comprises multiple beacon slots 230, where each device transmits its beacon in a respective one of the beacon slots 230. For example, device 1 transmits its beacon in the first beacon slot, device 2 transmits its beacon in the second beacon slot, etc. The devices transmit their beacons in the respective beacon slots 230 on either the control channel or the data channel. Illustratively, when the first device is using the control channel, then its beacon is transmitted on the control channel in the first beacon slot of the beacon period 210 of the superframe 200; and when the first device is using a data channel, then the first device still transmits on the data channel its beacon in the first beacon slot of the beacon period 210 of the superframe 200.

Figure 6:
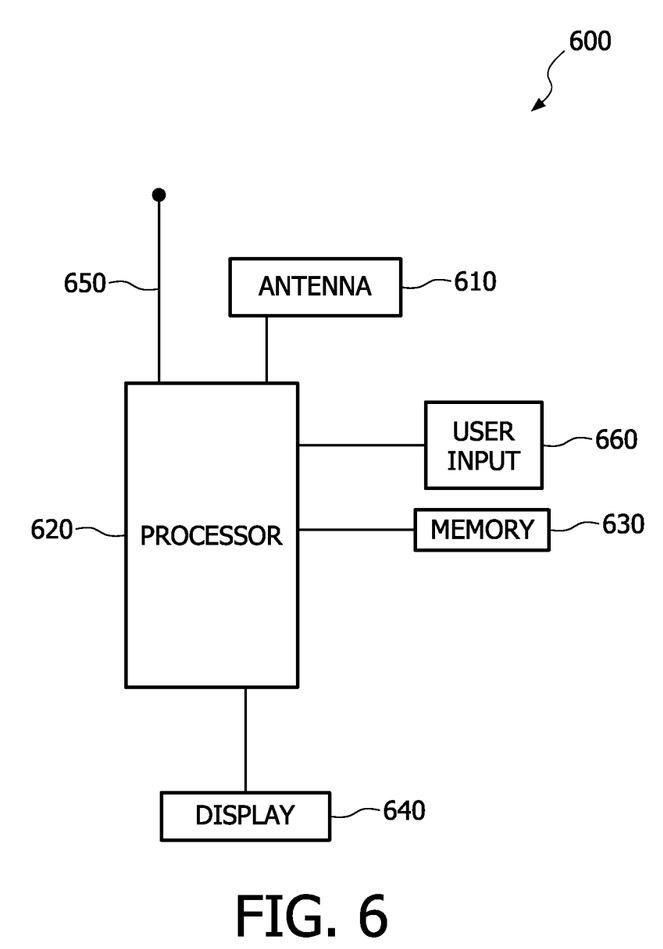
FIG. 6 shows a portion of a device including a directional antenna in accordance with another embodiment of the present system.

The processor 620 shown in FIG. 6 may be configured to divide the devices into two groups. One is the group of non-sharing devices, each of which only communicates with one other non-sharing device. The other is the group of sharing devices, which include all devices that do not belong to the first group and each of them may communicate with multiple devices.

When a non-sharing device is turned on, it first stays on the control channel until it finds its intended communication device. When two non-sharing devices decide to talk to each other, they choose or select one channel to begin the data communication and may send beacons on the (fixed/reserved) control channel only in the direction they exchange data packets. Beaconing protocols are described in U.S. Provisional Patent Application Ser. Nos. 60/885,184, and 60/885,192.

When a sharing device is turned on, it first stays at the control channel and scans all directions for beacons from existing devices. If the sharing device detects beacons, then it joins the existing beacon group. Otherwise, where no beacons are detected, the sharing device begins to transmit its own beacons. After the scanning phase where all directions are scanned, if the sharing device has not found the intended communication device yet, the sharing device adopts the timing structure in FIG. 3 to jump between different channels, such as jumping from channel 2 to channel 3 in the case where there are two data channels, as well as jumping to and from the control channel. In the illustrative embodiment shown in FIG. 2, the total number of channels is three. That is, there are a total of three channels, where one is the control channel having a time period of $T_c$ and the other two are the data channels. In the following illustrative embodiment, for simplicity, the number of data channels K is two (K=2), each having a time period of $T_d$. However, it should be understood that the number of data channels may be any integer number larger than or equal to one.

The following procedure is followed when a device is powered on. After being powered on, a device enters the first phase, namely, the control/common channel scan phase also referred to as the scan phase. In the scan phase, the device scans the control/common channel for two consecutive $N_{beam}$ superframes scanned in $N_{beam}$ beams or directions, which may be all directions covering a full sphere, or a portion thereof. That is, $N_{beam}$ is the number of sectors scanned by a device. Each sector of the $N_{beam}$ total sectors is scanned for a superframe period $T_s$. Thus, the time period for such a scan twice in all sectors is After the first phase or the (control/common channel) scan phase where the control/common channel is scanned in all sectors for a total of $2N_{beam}T_s$ time period (where each sector is scanned for a superframe period $T_s$), the device begins the second phase, referred to as a scan and jump phase, where control/data channels are scanned and the device jumps among the control/data channels. In the illustrative example used herein, the number of channels is three, namely one control channel scanned for a duration $T_c$ and two data channels each scanned for a duration $T_d$. During the second phase or the jump and scan phase, when the device finds its targeted device on a particular or selected data channel, the device stops the scanning and jumping, and starts communication on the particular or selected data channel; this is deemed to last or third phase. Of course, communication between the two devices is not confined to being through a data channel, and the control channel may also be used for communication between two devices.

Figure 5:
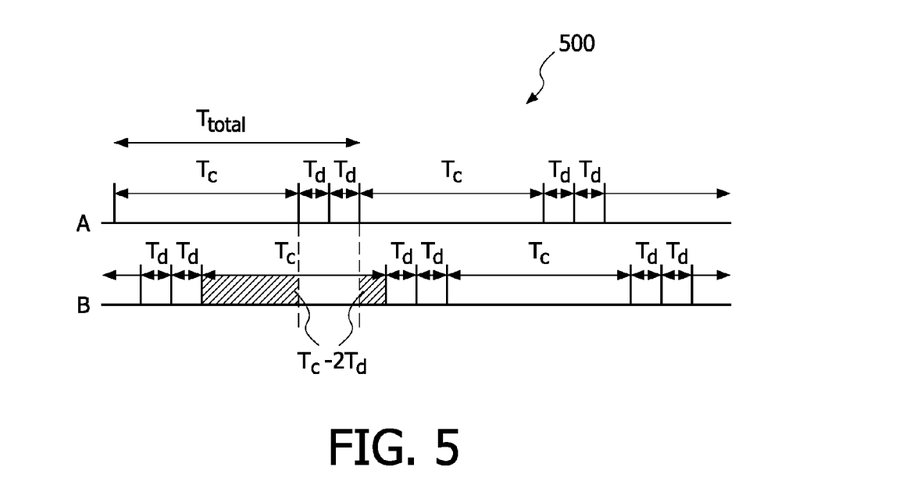
FIG. 5 shows two wireless devices that have different start times of duration period of $T_{total}$ for jumping between channels according to one embodiment.

There are four scenarios or cases where a new device A that has just been powered on is trying to find another device B that had been powered on previously:

Case 1 is the situation where the previously powered on device B is still in the control/common channel scan phase, and a new device A is powered on. If the new device A may not be able to find the old (or previously powered on) device B during the control/common channel scan phase of the new device A, then the new device A will establish its own superframe which may have a start time which is different then the start time of the superframe structure of the old device B. In this case, the finding time $T_f$ where the new device A will find the old device B is given by equation (1)

$$T_f \le T_{total} \times \frac{T_s}{T_c - KT_d} \times N_{beam} \tag{1}$$

where $T_{total}=T_c+2T_d$, $T_c$ is the duration that device A stays on and scans the control channel and $T_d$ is the duration that device A stays on scans the data channel, $T_s$ is a superframe period or duration, $N_{beam}$ is the number of sectors scanned by the new device A, and K is the number of data channels. This case will be further described in connection with FIG. 5 and equation (5) below for the illustrative example with two data channels (K=2).

Case 2 is the situation where the old device B is in its second phase or the scan and jump phase, and the new device A is powered on. The new device A will find the old device B in the first phase or scan phase of the first device A. The finding time $T_f$ is less than or equal to two scan periods of all the sectors, i.e., $2N_{beam}T_s$.

Figure 3:
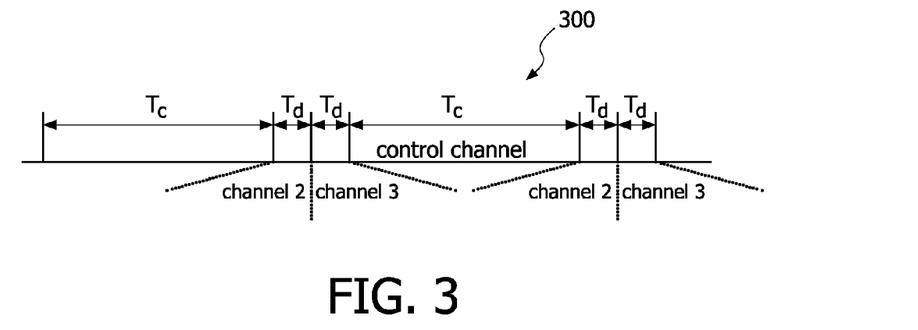
FIG. 3 shows a timing diagram for devices according to one embodiment of the present system.

Case 3 is the situation where the old device B is in the last or third phase and stays in a data channel other than the control channel (for communication with its targeted device that it has found), and the new device A is powered on. The new device A will find the old device B in its own second phase, namely, the scan and jump phase of the new device A. The finding time $T_f$ for the new device A to find the old device B is given by equation (2), which will be further described in connection with FIG. 3 and equation (3)

$$T_f \le T_{total} \times \frac{T_s}{T_d} \times N_{beam} \tag{2}$$

Case 4 is the situation where the old device B is in the last or third phase and stays in the control channel, and the new device A is powered on. The new device A will find the old device B in its own first phase, namely, the scan phase. The finding time $T_f$ for the new device A to find the old device B less than or equal to two scan periods of all the sectors, i.e., $2N_{beam}T_s$.

FIG. 3 shows a timing diagram 300 for non-sharing devices to jump between channels of superframes 200 shown in FIG. 2, where each superframe 200 has a duration of time period $T_s$. Let the total number of channels be 3, where one channel is the control channel, and the other two channels are data channels. That is, K or the number of data channels is 2, where each data channel has a duration of time period $T_d$ for transmission of data or content information.

Let $T_{total}=T_c+2T_d$. Each sharing device which has not begun the data communication repeats the jump sequence between channels every $T_{total}$ as shown in FIG. 3. When the device is on the control channel, it transmits its beacon as usual and also attempts to detect its intended communication device. When the device is on the data channel, it does not transmit beacons and only scan the channel to attempt to find the intended communication device.

The scanning procedure begins from one direction and goes through all the directions one by one. A scanning device 1 stays in each direction for a superframe scan period $T_s$, where $T_s$ is the duration of a superframe 200, as shown in FIG. 2. The time required to scan in all directions is $N_{beam}T_s$, where $N_{beam}$ is the number of sectors (of the new device which is trying to find other devices. It should be noted that different devices may have different number of sectors and $N_{beam}$ is not the number of devices or the number of data channels (of duration $T_d$). It should also be noted that, in a 2-dimensional space, then a circle or 360° covers all directions. However, in a 3-dimensional space, as is the case typically then, instead of a circle, a sphere covers all directions. The sphere may be divided into a number of sectors, and for full (spherical) coverage in all directions, then the directional antenna of a device 1 is moved for scanning in all directions or sectors. Of course, the number of sectors $N_{beam}$ of a device may not cover the whole sphere and depends on the design of the individual device and antenna.

A device may only transmit or receive in one direction (or in one sector) at any one time. Some device may be able to dynamically adjust the size of a sector or beam width. In the case where a device is capable of scanning in all directions or sectors, then $N_{beam}$ may also be regarded the number of sectors that the device actually uses to cover all the directions it could transmit or receive signals.

Suppose there are 4 devices that found each other and communicate with each other. For unicast communication (where there is a single medium access channel/physical channel MAC/PHY transmission only to a single device/destination), then two devices 1, 2 have to be directed towards each other at the same time in order for the two devices 1, 2 to communicate (transmit and/or receive data) with each other. These two devices 1, 2 can not communicate with other devices in the network when the two devices 1, 2 are communicating with each other, as wireless device normally only transmit or receive at a time, not both. For multicast communication (i.e., a multicast for a single MAC/PHY transmission towards two or more devices), then multiple destination-devices 2, 3, 4 have to be in the same sector (direction) of the transmitter (source) 1. If, after a first device 1 transmits data to a second device 2, the first device 1 wants to communicate with a third device 3, then the first device 1 has to change its beam direction, and is directed towards the third device 3 if the second and third devices 2, 3 are not in the same sector (and/or direction).

The above discussion applies to both the data transmission period in a superframe (where data is transmitted) as well as the beacon period of the superframe (where beacons and control information are transmitted). There are various beacon protocol related to how the devices transmit beacons towards each other, such as described in U.S. Provisional Patent Application Ser. Nos. 60/885,184, and 60/885,192 where, for example, there is a primary device which is the device to be turned on. This first or primary device establishes a superframe structure by sending a beacon in each sector/direction in a superframe. The primary device sends multiple beacons, one in each sector. Other devices referred to as secondary devices, which are turned-on or powered later after the primary device, join the superframe of the primary device. The secondary devices send only one beacon towards the primary device.

Returning to FIG. 3 where non-sharing devices want to find each other using the timing diagram 300, namely, by repeating the jump sequence 300 between channels every $T_{total}$, the scanning of all directions or sectors may be finished in one data transmission period $T_d$ or in multiple data transmission periods depending on the length of the data transmission period $T_d$.

If the intended communication device, denoted as B hereafter, has already gone to a data channel, the newly joined sharing device, denoted as A hereafter, will find device B during a finding time period $T_f$, where $T_f$ is defined by equation (3):

$$T_f \leq T_{total} \times \frac{T_s}{T_d} \times N_{beam}, \text{ or } T_d \leq T_{total} \times \frac{T_s}{T_f} \times N_{beam} \quad (3)$$

where:
  $T_{total} = T_c + KT_d$, (K=2 in this example for 2 data channels),
  $T_c$ is the duration of the control channel,
  $T_d$ is the duration of the data channel, and
  $N_{beam}$ is the total number of sectors of the new device A which is trying to find another device B.

The various parameters may be set to satisfy equation (3) which guarantees that a new device A will find an existing device B which is already transmitting, for example. Thus, if it is desired that new device A find existing device B in a given finding time $T_f$, for example, equation (3) yields the required data channel duration $T_d$, given $T_c$ and $N_{beam}$. Alternatively, if $T_{total}$, $T_c$, $T_d$ and $N_{beam}$ are given, then equation (3) may be used to determine the needed finding time $T_f$.

It should be noted that in the case where device B conducts data communication on the control channel (instead of using one of the data channels), then device B will stay on the control channel, and not change channels. Thus, device B will not adopt the above procedure to jump between channels. Therefore, when the new device A is turned on, then the new device A will find B in the scanning phase of device A after being powered or turned on.

Figure 4:
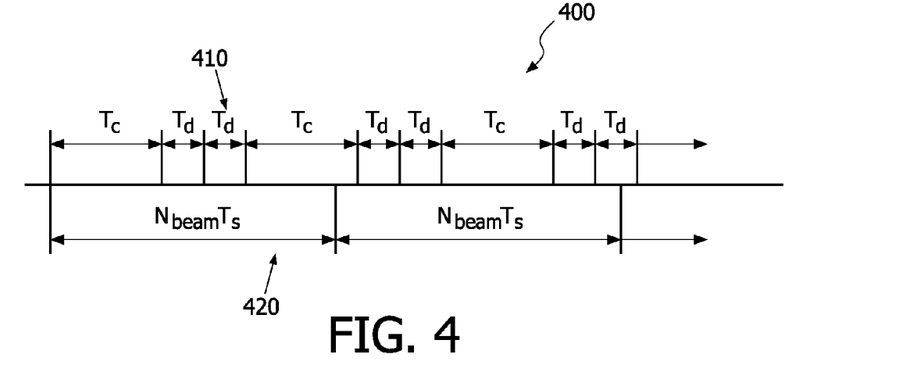
FIG. 4 shows a timing structure to guarantee that a new device A finds an existing device B in two consecutive scan periods of all the sectors in the initial scanning phase according to one embodiment.

FIG. 4 shows a timing structure 400 to guarantee that the new device A that was powered on (after device B) finds the existing device B (that had been powered on earlier) in two scan periods of all the sectors ($2N_{beam}T_s$) in the initial scanning phase. As shown in FIG. 4, if device B has not begun data communication, then the new device A may be able to detect some beacons over the control channel to join the beacon group that includes device B. In this way, the devices A and B will find each other in the same beacon group. To ensure that the new device A finds device B in the scanning phase of device A, the algorithm requires that the periods used by or dedicated for device B on the data channels do not occupy the same superframe in two consecutive $N_{beam}$ superframes scanned in $N_{beam}$ beams or directions, which may be all directions covering a full sphere, or a portion thereof. Since device A scans all directions one by one, for a superframe period $T_s$ for each direction or sector, then device A scans the same direction twice in two consecutive superframes. The algorithm or procedure guarantees that device B appears on the control channel at least once during the two chances when device A scans each direction. FIG. 4 illustrates such an example.

If the two devices A and B need to find each other after the initial scanning phase of device A, the timing structures for devices A and B to jump between channels may have different start time. The multi-channel neighbor discovery algorithm when executed on the processor 620 guarantees that both devices A and B are on the control channel at the same time for a certain period.

FIG. 5 shows two wireless devices A, B that have different start times of their periods of $T_{total}$ for jumping between channels. As previously noted $T_{total} = T_c + KT_d$, where K is the number of data channels which is two (K=2) in this illustrative example. As shown by the hash or diagonal lines in FIG. 5, the overlapping time $T_{overlapping}$ for both devices A and B on the control channel in each period $T_{total}$ is given by equation (4) for the case where there are two data channels or K=2:

$$T_{overlapping} \geq T_c - 2T_d \quad (4)$$

Therefore, the needed or required find time $T_f$ for the new device A to find the existing device B is approximately given by equation (5):

$$T_f \approx T_{total} \times \frac{T_s}{T_{overlapping}} \times N_{beam} \leq T_{total} \times \frac{T_s}{T_c - 2T_d} \times N_{beam} \quad (5)$$

At the worst case, $T_{overlapping} = T_c - 2T_d$, or the following as shown in equation (6):

$$T_c \approx 2T_d + T_{total} \times \frac{T_s}{T_f} \times N_{beam} \quad (6)$$

From equations (4) to (6), it is seen that the required relationship between $T_c$ and $T_d$ for device A to find device B is given by equation (7) is $$T_c > 2T_d \quad (7)$$

As long as equation (7) is satisfied, where the difference $T_c - 2T_d$ (i.e., $T_{overlapping}$) is at least the length or duration $T_s$ of a superframe, devices A and B will find each other. The specific values of these variables depend on the requirement of the finding time $T_f$ according to Equations (3) and (5). Of course, equation (7) is for the case where the number of data channels K is two (K=2). Thus, the general equation is $$T_c > KT_d \quad (8)$$

After two sharing devices A, B find each other and decide to conduct data communication between them, they select and go to a common channel (available to both devices A, B) and begin the data communication. The common channel may be either a data channel or the control channel.

If at least one of the two sharing devices A, B is able to switch its antenna direction and scan on a channel, and there is no other beaconing device to switch the antenna on that channel, then one of the devices A, B, which is able to switch its antenna, send beacons towards all directions in the beacon or control period 210 (FIG. 2). These beacons allow other sharing devices, which are turned on later, to find one or both sharing devices A, B.

The devices A, B (or 1, 2, 3, 4 shown in FIG. 1) that communicate with each other may have a portion shown in FIG. 6. In particular, FIG. 6 shows a portion of a device 600 having an antenna 610 which may be a fixed and/or a steerable directional antenna in accordance with an embodiment of the present system. For example, a portion of the present system 600 may further include a processor 620 operably coupled to a memory 630, a display 640, a wired connection 650, a user input device 660 and the antenna 610. The memory 630 may be any type of device for storing application data as well as other data related to the described operation. The application data and other data are received by the processor 620 for configuring the processor 620 to perform operation acts in accordance with the present system. The operation acts may include powering on, searching available channels and/or sectors for beacons, transmitting beacons, scanning, etc. Details of the device 600 are not introduced to simplify the discussion herein although would be apparent to a person of ordinary skill in the art. The device 600, depending on exactly the application, may include the user input or interface 660 and the display 640 to facilitate particular aspects of those embodiments although are not required for operation. For example, a user may provide user inputs via the user interface 660 to turn the device 600 on/off, and steer the antenna 610 towards a desired direction, such as toward another device for communication therewith. The display 640 may be configured to display various data, such as detected channels included in the list of channels, including displaying both lists of channels detected by both devices A, B that desire to communicate with each other, including various characteristics of the channels, such as QoS parameters including bandwidth, signal to noise ratio, intersymbol interference, sharing or non-sharing channels, and the like, associated with each channel, where an optimum channel available to both devices A, B is selected, either automatically bases on the QoS parameters, for example, or manually via user selection and input.

The operational acts of the processor 620 may further include controlling the display 640 to display any other content such as any content that would be applicable to the device 600, such as a user interface. The user input 660 may include a keyboard, mouse, trackball or other device, including touch sensitive displays, which may be stand alone or be a part of a system, such as part of a personal computer, personal digital assistant, mobile phone, set top box, television or other device for communicating with the processor 610 via any operable link. The user input device 660 may be operable for interacting with the processor 660 including enabling interaction within the user interface and/or other elements of the present system. Clearly the processor 620, the memory 630, display 640, antenna 610 and/or user input device 660 may all or partly be a portion of an antenna device or other device for operation in accordance with the present system, such as setting up a communication system including start-up, discovery and communication among a plurality of steerable and non-steerable devices.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 630 or other memory coupled to the processor 620.

The memory 630 configures the processor 620 to implement the methods, operational acts, and functions disclosed herein. The memories may be distributed, for example between the antenna and the processor 620, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 620. With this definition, information accessible through the wired connection 650 (e.g., wired connection to a network such as the Internet) and/or the antenna 610 is still within the memory 630, for instance, because the processor 620 may retrieve the information from one or more of the operable connections 610, 650 in accordance with the present system.

The processor 620 is operable for providing control signals and/or performing operations in response to input signals from the user input device 660 as well as in response to other devices of a network and executing instructions stored in the memory 630. The processor 620 may be an application-specific or general-use integrated circuit(s). Further, the processor 620 may be a dedicated processor for performing in accordance with the present system or may be a general-purpose processor wherein only one of many functions operates for performing in accordance with the present system. The processor 620 may operate utilizing a program portion, multiple program segments, or may be a hardware device utilizing a dedicated or multi-purpose integrated circuit. Further variations of the present system would readily occur to a person of ordinary skill in the art and are encompassed by the following claims.

Of course, it is to be appreciated that any one of the above embodiments or processes may be combined with one or more other embodiments and/or processes or be separated and/or performed amongst separate devices or device portions in accordance with the present system.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for communication between a first device having a first directional antenna and a second device having a second directional antenna, the method comprising:

establishing a superframe having a superframe duration ($T_s$) and transmitting a beacon by the first device during each of the superframe duration ($T_s$);

performing a sector scan by scanning all sectors ($N_{beam}$) by the second device for two scan periods ($2N_{beam}T_s$) in each sector scan, the second device scanning each sector for a superframe duration ($T_s$) within each scan period;

performing a jump sequence between channels, the jump sequence having a sequence duration ($T_{total}$) which is equal to a sum of a control duration ($T_c$) of a control channel and durations of data channels ($KT_d$);

repeating the jump sequence;

establishing a new superframe if no existing beacons are detected on the control channel, or joining an existing superframe on the control channel during the control duration ($T_c$) if existing beacons are detected on the control channel;

scanning by the second device during a duration of a data channel ($T_d$);

finding the first device by the second device during a find time ($T_f$);

selecting a common channel to start communication with the first device over the common channel and stopping the jump sequence.

2. The method of claim 1, wherein the control duration ($T_c$) is greater than the durations of data channels ($KT_d$).

3. The method of claim 1 wherein, when the first device is repeating the jump sequence, the find time ($T_f$) is less than or equal to sequence duration ($T_{total}$) multiplied by time for scanning all the sectors ($N_{beam}T_s$) divided by the duration of the data channel ($T_d$).

4. The method of claim 1 wherein, when the first device is communicating with other devices after stopping the jump sequence, the find time ($T_f$) satisfies the following relationship:

$$T_f \leq T_{total} \times \frac{T_s}{T_d} \times N_{beam}$$

where $T_{total} = T_c + KT_d$,

K is a number of the data channels, $T_c$ is a duration of the control channel, $T_s$ is the superframe duration, $T_d$ is a duration of the data channel, and $N_{beam}$ is a total number of sectors scanned by the second device.

5. The method of claim 1 wherein, when the first device is communicating with other devices after stopping the jump sequence, the duration of the data channel ($T_d$) satisfies the following relationship:

$$T_d \leq T_{total} \times \frac{T_s}{T_f} \times N_{beam}$$

where $T_{total} = T_c + KT_d$,

K=number of the data channels, $T_c$ is a duration of the control channel, $T_f$ is a time needed for the second device to find the first device, and $N_{beam}$ is a total number of sectors scanned by the second device.

6. The method of claim 1 wherein, when the first device is repeating the jump sequence or when the jump sequence for the second device has a different start time than a start time of the jump sequence for the first device, the finding act finds the first device on the control channel by the second device.

7. The method of claim 1 wherein, when the first device is communicating with other devices after stopping the jump sequence, the finding act finds the first device on the control channel by the second device.

8. The method of claim 1 wherein, when the jump sequence for the second device has a different start time than a start time of the jump sequence for the first device, then the find time ($T_f$) satisfies the following relationship:

$$T_f \leq T_{total} \times \frac{T_s}{T_c - KT_d} \times N_{beam}$$

where $T_{total} = T_c + KT_d$,

K is a number of the data channels, $T_c$ is a duration of the control channel, $T_s$ is the superframe duration, $T_d$ is a duration of the data channel, and $N_{beam}$ is a total number of sectors scanned by the second device.

9. A communication system comprising a first device and a second device, wherein a processor of at least one of the first device and the second device is configured to:

establish a superframe having a superframe duration ($T_s$) and transmit a beacon by the first device during each of the superframe duration ($T_s$);

perform a sector scan by scanning all sectors ($N_{beam}$) by the second device for two scan periods ($2N_{beam}T_s$) in each sector scan, the second device scanning each sector for a superframe duration ($T_s$) within each scan period;

perform a jump sequence between channels, the jump sequence having a sequence duration ($T_{total}$) which is equal to a sum of a control duration ($T_c$) of a control channel and durations of data channels ($KT_d$);

repeat the jump sequence;

establish a new superframe if no existing beacons are detected on the control channel, or joining an existing superframe on the control channel during the control duration ($T_c$) if existing beacons are detected on the control channel;

scan by the second device during a duration of a data channel ($T_d$);

find the first device by the second device during a find time ($T_f$); and select a common channel to start communication with the first device over the common channel and stopping the jump sequence.

10. The communication system of claim 9, wherein the control duration ($T_c$) is greater than the durations of data channels ($KT_d$).

11. The communication system of claim 9, wherein, when the first device is repeating the jump sequence, the find time ($T_f$) is less than or equal to sequence duration ($T_{total}$) multiplied by time for scanning all the sectors ($N_{beam}T_s$) divided by a duration of a data channel ($T_d$).

12. The communication system of claim 9, wherein, when the first device is communicating with other devices after stopping the jump sequence, the find time ($T_f$) satisfies the following relationship:

$$T_f \le T_{total} \times \frac{T_s}{T_d} \times N_{beam}$$

where
$T_{total} = T_c + KT_d$,
K is a number of the data channels,
$T_c$ is a duration of the control channel,
$T_s$ is the superframe duration,
$T_d$ is a duration of the data channel, and
$N_{beam}$ is a total number of sectors scanned by the second device.

13. The communication system of claim 9, wherein, when the first device is communicating with other devices after stopping the jump sequence, the duration of a data channel ($T_d$) satisfies the following relationship:

$$T_d \le T_{total} \times \frac{T_s}{T_f} \times N_{beam}$$

where
$T_{total} = T_c + KT_d$,
K=number of the data channels,
$T_c$ is a duration of the control channel,
$T_f$ is a time needed for the second device to find the first device, and
$N_{beam}$ is a total number of sectors scanned by the second device.

14. The communication system of claim 9 wherein, when the first device is repeating the jump sequence or when the jump sequence for the second device has a different start time than a start time of the jump sequence for the first device, the processor is configured to find the first device on the control channel by the second device.

15. The communication system of claim 9 wherein, when the first device is communicating with other devices after stopping the jump sequence, the processor is configured to find the first device on the control channel by the second device.

16. The communication system of claim 9 wherein, when the jump sequence for the second device has a different start time than a start time of the jump sequence for the first device, then the find time ($T_f$) satisfies the following relationship:

$$T_f \le T_{total} \times \frac{T_s}{T_c - KT_d} \times N_{beam}$$

where
$T_{total} = T_c + KT_d$,
K is a number of the data channels,
$T_c$ is a duration of the control channel,
$T_s$ is the superframe duration,
$T_d$ is a duration of the data channel, and $N_{beam}$ is a total number of sectors scanned by the second device.

17. A computer program product stored on a non-transitory computer readable medium, the computer program when executed by a processor is configured to:

establish a superframe having a superframe duration ($T_s$) and transmit a beacon by a first device during each of the superframe duration ($T_s$);

perform a sector scan of by scanning all sectors ($N_{beam}$) by a second device for two scan periods ($2N_{beam}T_s$) in each sector scan, the second device scanning each sector for a superframe duration ($T_s$) within each scan period;

perform a jump sequence between channels, the jump sequence having a sequence duration ($T_{total}$) which is equal to a sum of a control duration ($T_c$) of a control channel and durations of data channels ($KT_d$);

repeat the jump sequence;

establish a new superframe if no existing beacons are detected on the control channel, or joining an existing superframe on the control channel during the control duration ($T_c$) if existing beacons are detected on the control channel;

scan by the second device during a duration of a data channel ($T_d$);

find the first device by the second device during a find time ($T_f$) which is less than or equal two scan periods of all the sectors ($2N_{beam}T_s$); and selecting a common channel to start communication with the first device over the common channel and stopping the jump sequence.

18. The computer program product of claim 17, wherein the control duration ($T_c$) is greater than the durations of data channels ($KT_d$).

19. The computer program product of claim 17 wherein, when the first device is repeating the jump sequence, the find time ($T_f$) is less than or equal to sequence duration ($T_{total}$) multiplied by time for scanning all the sectors ($N_{beam}T_s$) divided by a duration of a data channel ($T_d$).

20. The computer program product of claim 17 wherein, when the first device is communicating with other devices after stopping the jump sequence, the find time ($T_f$) satisfies the following relationship:

$$T_f \le T_{total} \times \frac{T_s}{T_d} \times N_{beam}$$

where
$T_{total} = T_c + KT_d$,
K is a number of the data channels,
$T_c$ is a duration of the control channel,
$T_s$ is the superframe duration, $T_d$ is a duration of the data channel, and
$N_{beam}$ is a total number of sectors scanned by the second device.

21. The computer program product of claim 17 wherein, when the first device is communicating with other devices after stopping the jump sequence, the duration of a data channel ($T_d$) satisfies the following relationship:

$$T_d \leq T_{total} \times \frac{T_s}{T_f} \times N_{beam}$$

where
$T_{total}=T_c+KT_d$,
K=number of the data channels,
$T_c$ is a duration of the control channel,
$T_f$ is a time needed for the second device to find the first device, and
$N_{beam}$ is a total number of sectors scanned by the second device.

22. The computer program product of claim 17 wherein, when the first device is repeating the jump sequence or when the jump sequence for the second device has a different start time than a start time of the jump sequence for the first device, the processor is configured to find the first device on the control channel by the second device.

23. The computer program product of claim 17 wherein, when the first device is communicating with other devices after stopping the jump sequence, the processor is configured to find the first device on the control channel by the second device.

24. The computer program product of claim 17 wherein, when the jump sequence for the second device has a different start time than a start time of the jump sequence for the first device, then the find time ($T_f$) satisfies the following relationship:

$$T_f \leq T_{total} \times \frac{T_s}{T_c - KT_d} \times N_{beam}$$

where
$T_{total}=T_c+KT_d$,
K is a number of the data channels,
$T_c$ is a duration of the control channel,
$T_s$ is the superframe duration,
$T_d$ is a duration of the data channel, and
$N_{beam}$ is a total number of sectors scanned by the second device.

* * * * *